United States Patent
Jiang et al.

(10) Patent No.: US 9,929,805 B2
(45) Date of Patent: Mar. 27, 2018

(54) GENERATING A PILOT TONE FOR AN OPTICAL TELECOMMUNICATIONS SYSTEM

(71) Applicants: Zhiping Jiang, Kanata (CA); Zhuhong Zhang, Ottawa (CA); Chuandong Li, Ottawa (CA)

(72) Inventors: Zhiping Jiang, Kanata (CA); Zhuhong Zhang, Ottawa (CA); Chuandong Li, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 38 days.

(21) Appl. No.: 15/151,895

(22) Filed: May 11, 2016

(65) Prior Publication Data
US 2017/0331551 A1 Nov. 16, 2017

(51) Int. Cl.
*H04J 14/02* (2006.01)
*H04B 10/11* (2013.01)
*H04L 5/00* (2006.01)
*H04B 1/00* (2006.01)
*H04B 10/556* (2013.01)

(52) U.S. Cl.
CPC ........... *H04B 10/11* (2013.01); *H04B 1/0007* (2013.01); *H04B 10/5563* (2013.01); *H04J 14/02* (2013.01); *H04L 5/0048* (2013.01)

(58) Field of Classification Search
CPC .. H04B 10/11; H04B 10/5563; H04B 1/0007; H04J 14/02; H04L 5/0048
USPC .......................................................... 398/79
See application file for complete search history.

(56) References Cited

U.S. PATENT DOCUMENTS

| 6,912,233 | B2 * | 6/2005 | Spruyt .................. | H04L 27/261 370/430 |
|---|---|---|---|---|
| 7,209,660 | B1 * | 4/2007 | Yee ........................ | H04B 10/50 398/141 |
| 2003/0016413 | A1 * | 1/2003 | Carrick .................. | H04B 10/00 398/79 |
| 2005/0190428 | A1 | 9/2005 | Gronbach | |
| 2009/0232518 | A1 | 9/2009 | Caton et al. | |
| 2013/0251364 | A1 * | 9/2013 | Pachnicke ........... | H04J 14/0276 398/32 |
| 2014/0178065 | A1 | 6/2014 | Mertz et al. | |

FOREIGN PATENT DOCUMENTS

| CN | 101651498 A | 2/2010 |
|---|---|---|
| CN | 103312645 A | 9/2013 |

OTHER PUBLICATIONS

International Search Report for International Application No. PCT/CN2017/083779 dated Aug. 2, 2017.

* cited by examiner

*Primary Examiner* — Juan A Torres
(74) *Attorney, Agent, or Firm* — Gowling WLG (Canada) LLP

(57) ABSTRACT

The disclosure is directed to a method and system for generating a pilot tone for an optical signal with an optical telecommunications system. The pilot tone is generated in the digital domain by modulating the data to be transmitted to a destination node within the optical telecommunications network. The modulation of the data introduces occurrence modulation to the optical signal.

20 Claims, 15 Drawing Sheets

GENERATING A PILOT TONE FOR AN OPTICAL TELECOMMUNICATIONS SYSTEM

FIELD OF THE DISCLOSURE

The current disclosure is generally directed to optical telecommunication systems and, more specifically, is directed to a method and system for generating a pilot tone for an optical telecommunications system.

BACKGROUND

The use of optical telecommunication systems, or networks, is growing and technology in this field is also improving. Optical telecommunication systems typically include a set of nodes which communicate with each other. In Dense Wavelength Division Multiplexing (DWDM) systems, light at multiple wavelengths is modulated with streams of digital information, and then the modulated light beams at different wavelengths, termed "wavelength channels", are combined for joint propagation in an optical fiber.

To identify wavelength channels in a DWDM system, a pilot tone may be applied to communication channels within the optical telecommunications system. The pilot tone is typically a low frequency modulation of a wavelength channel's optical power level. The pilot tone carries information associated with the wavelength channel, such as, but not limited to, its wavelength and other identification information for supervisory, control, equalization, continuity, synchronization, or reference purposes.

By providing this pilot tone, communication between the transmitting node and the receiving node over the communication channel is improved as there is more information shared. The pilot tone also allows for data sharing between the different nodes within the optical telecommunications network. Detrimentally, the introduction of pilot tones requires a dedicated optical modulator or variable optical attenuator for each wavelength channel, which increases equipment cost and complexity, especially for optical communication systems carrying many wavelength channels.

Therefore, there is a need for an improved system and method for identifying wavelength channels in optical telecommunication systems.

SUMMARY

The following presents a simplified summary of some aspects or embodiments of the disclosure in order to provide a basic understanding of the disclosure. This summary is not an extensive overview of the disclosure. It is not intended to identify key or critical elements of the disclosure or to delineate the scope of the disclosure. Its sole purpose is to present some embodiments of the disclosure in a simplified form as a prelude to the more detailed description that is presented later.

The disclosure is directed to a method and system for generating a pilot tone for an optical signal being transmitted in an optical telecommunications system. The pilot tone is generated in the digital domain, such as by a transmitter within the optical telecommunications system. The generation of the pilot tone in the digital domain provides various advantages over current methods of pilot tone generation, which typically occurs in the analog domain.

In one embodiment, the method includes the generation of occurrence modulation for the pilot tone. The system may include an apparatus for pre-conditioning data that is being transmitted from a transmitter within the telecommunications system and then modulates this pre-conditioned data before converting the digital signal to an analog counterpart for delivering of the data (in the form of an optical signal) to a receiver at a destination node.

In another embodiment, a data driver supplies the information that is to be transmitted from the transmitting node to the receiving, or destination, node. A transmitter within the transmitting node may include a pre-conditioning apparatus which performs various processes on the information. This pre-conditioned information may be modulated before being converted to an analog signal for transmission to the destination node.

In one aspect of the disclosure, there is provided a method of generating a pilot tone for an optical telecommunication system that includes providing digital data having a data rate, for transmission to a destination node and then modulating the digital data at a pilot tone frequency lower than the data rate, to provide a modulated digital output. The modulated digital output is then converted to an analog signal to generate the pilot tone.

In another aspect, the modulation is performed to a peak-to-peak modulation depth less than a least significant bit (LSB) of the digital-to-analog conversion. In another aspect, the peak-to-peak modulation depth is less than 10% of the LSB of the digital-to-analog conversion.

In yet a further aspect, before modulating the digital data, the digital data is pre-conditioned to add a pre-determined amount of randomness to the digital data. In one aspect, the pre-conditioning is performed to add a random or pseudo-random value of no greater than +/−0.5 of the LSB to each data point within the digital data.

In a further aspect, modulation of the digital data multiplying the digital data by a modulation factor.

In yet another aspect, there is provided a system for generating a pilot tone for an optical telecommunications link including a data driver for providing digital data having a data rate; and a modulator for modulating the digital data provided by the data driver at a pilot tone frequency lower than the data rate, to provide a modulated digital output. The system further includes a digital-to-analog converter (DAC) for receiving the modulated digital output and converting the modulated digital output to an analog signal to generate the pilot tone. In one aspect, the modulator, which can be an apparatus such as a multiplier, is configured to modulate the digital data at a modulation depth less than a LSB of the DAC.

In another aspect of the disclosure, the system further includes a pre-conditioning apparatus configured for pre-conditioning the digital data to add a pre-determined amount of randomness to the digital data. In one embodiment, the pre-conditioning apparatus is configured to add a random or pseudo-random value of no greater than +/−0.5 of the LSB to each data point within the digital data.

DESCRIPTION OF THE FIGURES

Embodiments of the present disclosure will now be described, by way of example only, with reference to the attached figures.

FIG. 1b is a schematic diagram of a channel within the optical telecommunications system of FIG. 1a;

DETAILED DESCRIPTION

The following detailed description contains, for the purposes of explanation, numerous specific embodiments implementations, examples and details in order to provide a thorough understanding of the disclosure. It is apparent, however, that the embodiments, may be practiced without these specific details or with an equivalent arrangement. In other instances, some well-known structures and devices are shown in block diagram form in order to avoid unnecessarily obscuring the embodiments of the disclosure. The description should in no way be limited to the illustrative implementation, drawings and techniques illustrated below, including the exemplary designs and implementations illustrated and described herein, but may be modified within the scope of the appended claims along with their full scope of equivalents.

The disclosure is directed to a method and system for generating a pilot tone for an optical telecommunications system. In one embodiment, the pilot tone is generated in the digital domain with occurrence modulation. By generating the pilot tone in the digital domain, advantages over some current solutions may be realized.

Currently, when a transmitter (within the transmitting node) delivers an optical signal, the pilot tone is added to the analog optical signal via a variable optical attenuator (VOA) which modulates the power level of the optical signal. The VOA level of attenuation is controlled by a time-varying control signal. Using this approach, it is generally hard to achieve high frequency modulation. In another current solution, the pilot tone (or modulation) is added through a data driver within the transmitter, however this requires feedback control and calibration as this entire process is being performed in the analog domain.

Figure 1A:
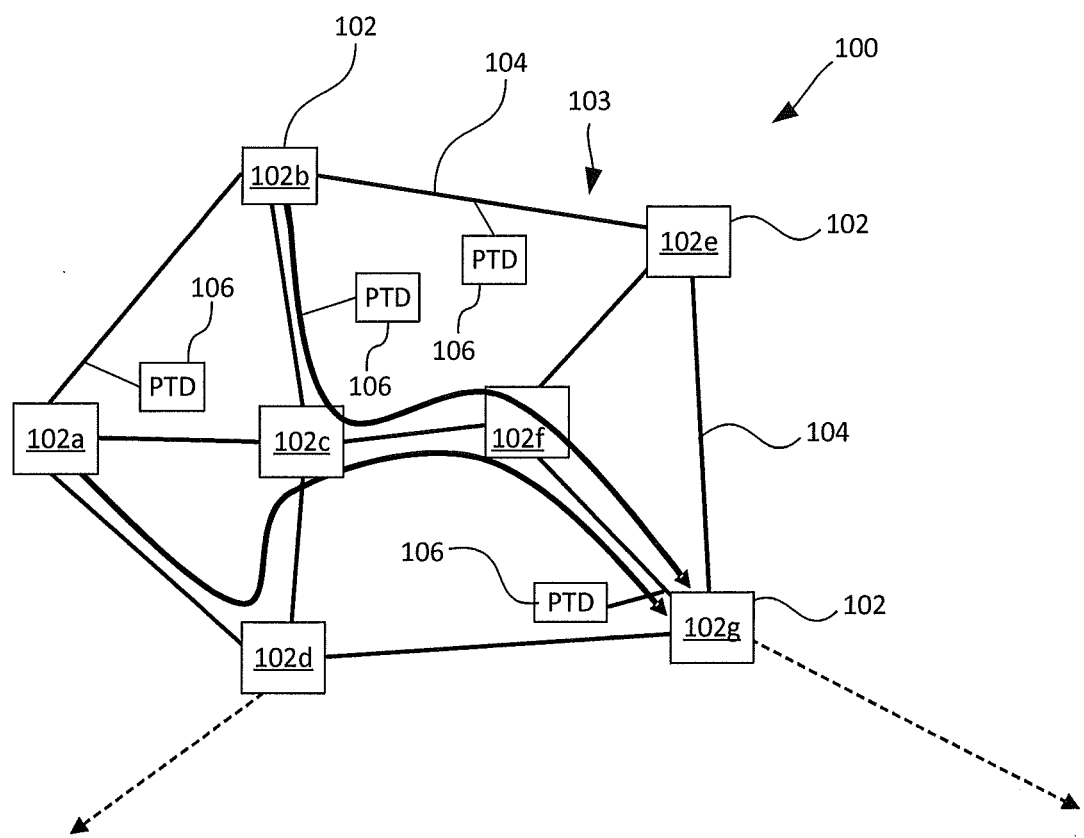
FIG. 1a is a schematic diagram of an optical telecommunications system.

Turning to FIG. 1a, a schematic diagram of an optical telecommunications system is shown. The optical telecommunications system, or optical network, 100 includes a set of nodes 102a-102g which are connected with each other via individual optical transmission fibers 103. The nodes 102 may be connected with each other via more than one transmission fiber 103. Signals transmitted along these individual transmission fibers 103 produce a plurality of wavelength channels 104, each wavelength channel including light at a particular wavelength modulated with a high-speed digital stream of information. For ease of understanding, a transmission node is seen as the node 102a which is delivering data while a destination, or receiving, node 102g is seen as a node which is receiving the data. In some cases, communication between two nodes may not be direct. By way of example, communication between the transmission node 102a and the destination node 102g is such that the data passes through other nodes, such as 102b and 102e between the transmission node 102a and the destination node 102g.

Within the network 100 are a set of pilot tone detectors 106 which monitor channel information, or characteristics, of the channels 104 by detecting pilot tones which are modulated onto the wavelength channels 104 traveling between the transmission nodes 102a-102g. These characteristics may include, but are not limited to, source/destination identification (ID), wavelength, power, modulation format or baud rate or any other characteristics or combination of those characteristics. In one embodiment, the pilot tone detectors 106 include a low-speed photodiode and a digital signal processor (DSP).

Figure 1B:
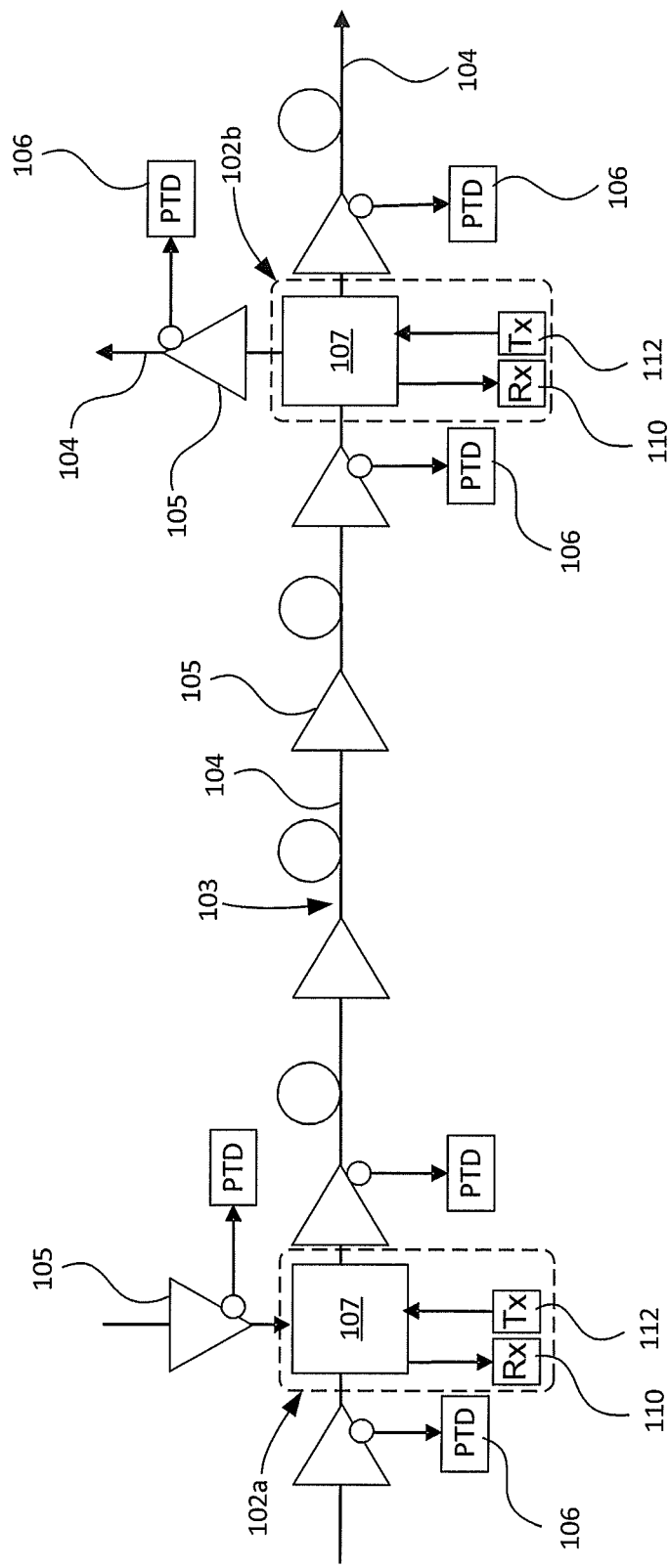

Turning to FIG. 1b, a schematic diagram showing a portion of the optical telecommunications system of FIG. 1a is provided. FIG. 1b shows the connection between two nodes 102a and 102b which are connected by the transmission fiber 103. Optical amplifiers 105 are provided to amplify the wavelength channels 104. In FIG. 1b, one of the nodes 102a may be seen as the source, or transmission, node, and the second of the nodes 102b may be seen as the destination node. In the embodiment of FIG. 1b, individual pilot tone detectors 106 are connected at the beginning and the end of the transmission fiber 103 between the two nodes 102, however, the pilot tone detectors 106 may be located anywhere within the communication channel. Depending on the type of nodes 102a or 102b, the nodes 102a or 102b may include a reconfigurable optical add/drop multiplexor (ROADM) 107 coupled to a receiver 110 and a transmitter 112 for dropping and adding wavelength channels. For example, if the node 102 is an amplifier node, the node 102 would not include any receiver or transmitter, however, if the node 102 is an access node, there may be 0, one or multiple receivers 110 and transmitters 112. Accordingly, the wavelength channels 104 may terminate at a destination node 102b or propagate further, as shown with an arrow to the right of the node 102b.

Figure 2:
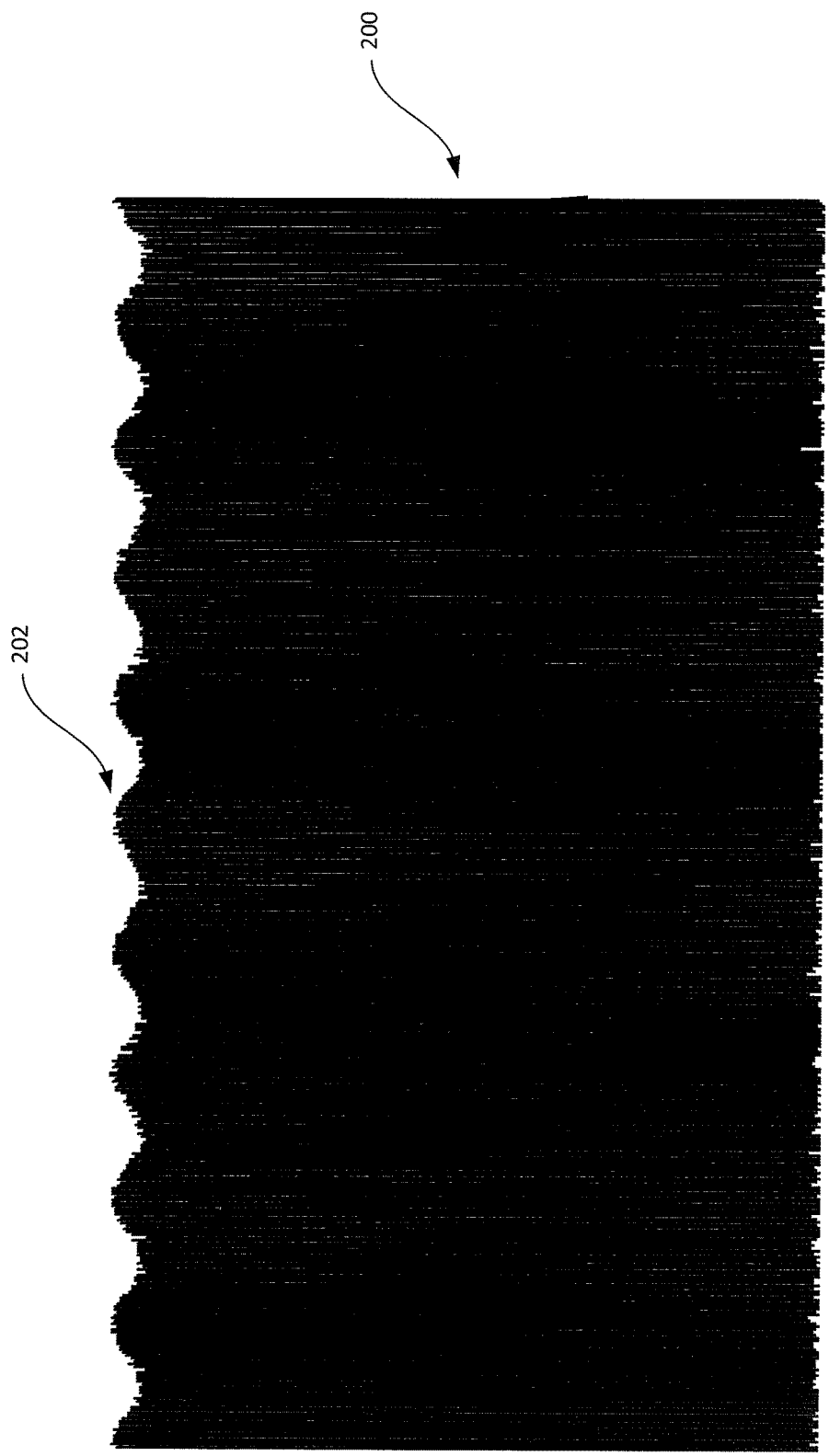
FIG. 2 is an example of a pilot tone.

Turning to FIG. 2, a schematic time trace of a pilot tone modulated wavelength channel optical power is provided. The diagram provides one example of the data within the optical signal which is being transmitted between nodes 102a and 102b. Within the high-speed data 200 is a pilot tone 202, which is a small and low frequency (tens of MHz or below) modulation, applied to a high speed (many Gbps) wavelength channel. Typically, each wavelength channel 104 is assigned its own unique low frequency of modulation; thus, a low-frequency electrical spectrum of a small portion of the high-speed data 200 detected by the pilot tone detector 106 is representative of the wavelength channels present. Furthermore, the low-frequency signal can itself be modulated with channel-specific information such as modulation format, modulation rate, etc., enabling the pilot tone to be used for supervisory, control, equalization, continuity, synchronization, or reference purposes for the optical telecommunications system 100. In the current disclosure, the pilot tone is generated in the digital domain prior to being converted into an analog signal and transmitted together with the high speed data signal. A pilot tone detector 106 at the destination node (or at any place within the optical telecommunication system 100) is then able to monitor channel information associated with all of the wavelength channels 104 within the optical system 100 as information is being transmitted between nodes 102.

Figure 3A:
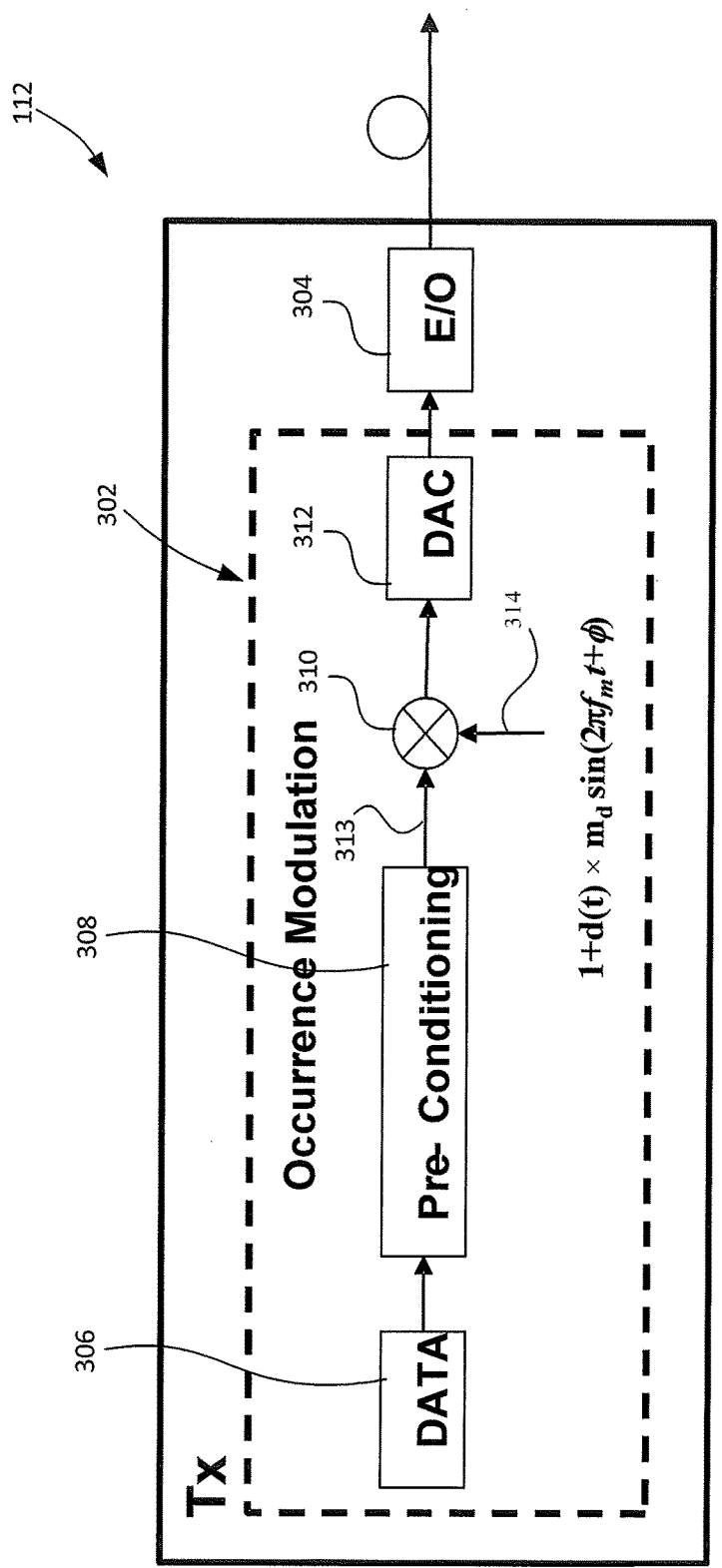
FIG. 3a is a schematic diagram of apparatus for generating occurrence modulation for a pilot tone.

Turning to FIG. 3a, a schematic diagram of a transmitter within one of the nodes 102a-102g is shown. The transmitter, such as the one mentioned in FIG. 1b, 112 includes an occurrence modulation portion 302 which is connected to an electrical-to-optical converter (E/O) 304. In one embodiment, the occurrence modulation portion 302 is located within a digital signal processor (DSP) or a transmitter that is part of an optical communications link.

The occurrence modulation portion 302 includes a data driver or processing portion 306 that provide digital data having a data rate and an optional pre-conditioning apparatus 308 for pre-conditioning the digital data to include an amount of randomness to the digital data. For digital data already including a degree of randomness due to prior processing, imperfect electronics, interference, etc., the pre-conditioning apparatus 308 may not be required. The occurrence modulation portion 302 further includes a modulator, such as multiplier 310, for modulating the digital data and a digital-to-analog converter (DAC) 312. In one embodiment, the DAC is a low resolution DAC. Due to high operational speeds, a DAC usually has a limited number of bits with an effective number of bits (ENOB) of less than 6 bits although this number may be different for different DACs. Depending on the system, the modulator may be an amplitude, frequency or phase modulator.

In one embodiment, the transmitter 112 is a coherent transmitter having a dual polarization I/Q modulator. In the coherent transmitter embodiment, there are four independent data transmission streams. Therefore it should be understood that the node 102 includes four parallel occurrence modulation blocks or portions 302 for that embodiment.

In one embodiment, structurally within the occurrence modulation portion 302, the data driver 306 is connected to the pre-conditioning apparatus 308 which has its output connected to a first input 313 of the multiplier 310. A second input 314 to the multiplier 310 introduces a modulation factor to the first input 313. In one embodiment, the first input 313 is modulated with the factor of $1+d(t)*md \sin(2\pi fmt+\varphi)$ where d(t) is the pilot tone data (its value can be 1, 0, or −1) to be transmitted, md represents a modulation depth, fm represents a frequency value and $\varphi$ represents a phase value. An output of the multiplier 310 is connected to an input of the DAC 312 which, in turn, is connected to the E/O 304. In another embodiment, modulation of the amplitude and/or the phase of the data can also be performed. In this embodiment, a modulation factor represented by equation $m(t)=A(t)\exp(j\varphi(t))$ may be used as the second input 314, where A(t) is the amplitude and $\varphi(t)$ is the phase modulation.

Figure 3B:
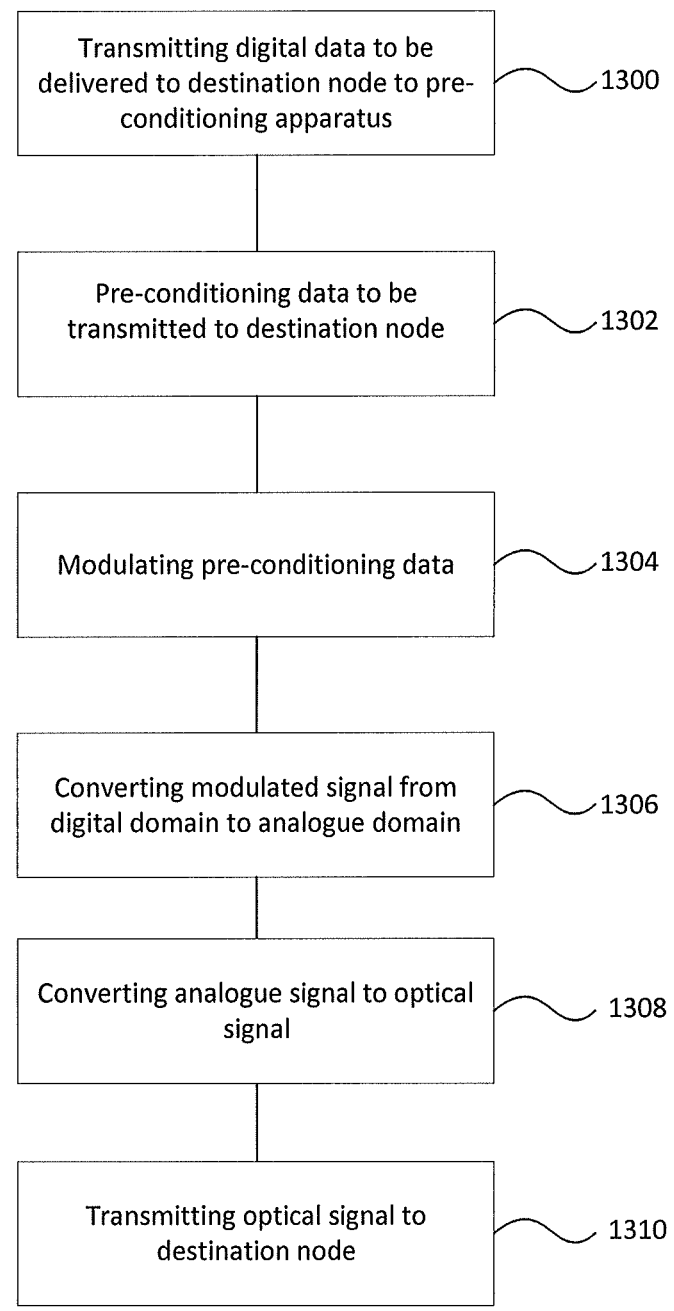
FIG. 3b is a flowchart outlining a method for generating occurrence modulation for a pilot tone.

Turning to FIG. 3b, a flowchart of a method for generating a pilot tone for an optical telecommunications system is shown. After it is determined that data is to be sent from a transmission node 102a to a destination node 102b, the data is generated and sent to the transmitter 112 for transmission to the destination node 102b. The data, or digital data, preferably includes a data rate. After receiving the data in the digital domain, the data that is to be transmitted is pushed or driven (1300) by the data driver 306 to the pre-conditioning apparatus 308. The digital data may then be pre-conditioned (1302) by the pre-conditioning apparatus 308 to add an amount of randomness to the digital data. In one embodiment, pre-conditioning can be achieved by adding a small random value (no greater than +/−0.5 of the least significant bit (LSB) of the DAC) to each original data point. The pre-conditioning may not be required when the signal already carries some randomness component to it due to noise, imperfect circuitry, etc., or naturally achieved when other functionalities are performed, such as, but not limited to, pulse shaping. After being pre-conditioned, the output of the pre-conditioning apparatus 308 is then modulated (1304) by multiplying the output of the pre-conditioning apparatus with a modulation factor to produce a modulated digital output. This process may be seen as occurrence modulation. The occurrence modulation assists in generating a pilot tone, in the digital domain, for the data being transmitted. Typically, the modulation of the digital data is performed at a pilot tone frequency lower than the data rate. In one embodiment, the modulation factor is $1+d(t)*m_d \sin(2\pi f_m t+\varphi)$ where d(t) is the pilot tone data to be transmitted, $m_d$ represents a modulation depth, $f_m$ represents a frequency value and $\varphi$ represents a phase value. After being modulated, the modulated digital output is then transmitted to the DAC 312 which converts (1306) the modulated digital output from a signal in the digital domain to an analog signal for transmission to the destination node 102b over communication channels within the optical telecommunications system 100. In one embodiment, the modulation in 1304 may be preferably performed to a peak-to-peak modulation depth less than a LSB of the digital-to-analog conversion and more specifically, may be performed to a peak-to-peak modulation depth less than 10% of the digital-to-analog conversion.

The analog signal is then converted (1308) from an electric signal to an optical signal by the E/O 304 before being transmitted (1310) to the destination node.

Figure 4B:
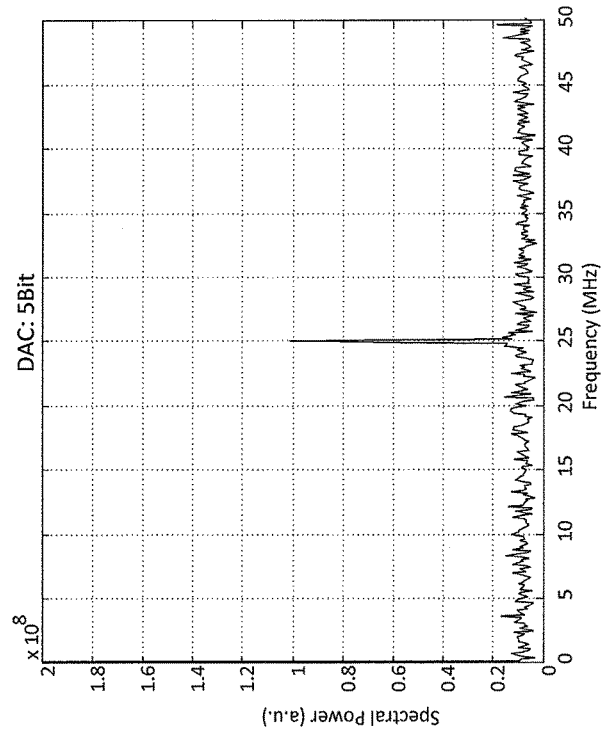
FIGS. 4a to 4c are simulation graphs of modulation depths for digital to analog convertors.
Figure 4A:
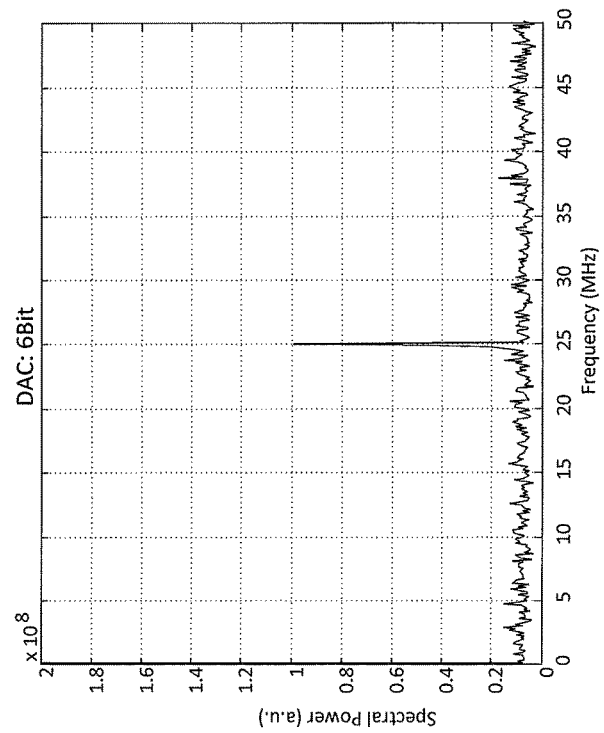
Figure 4C:
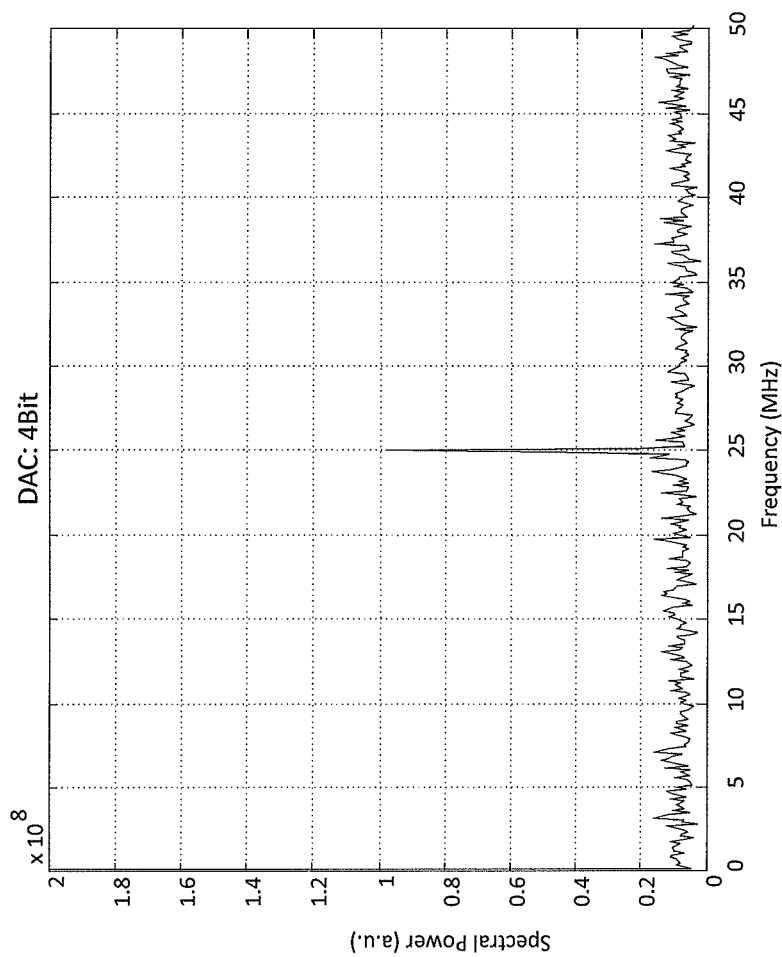

Turning to FIGS. 4a to 4c, sample charts illustrating various simulations using the transmitter of FIG. 3 are shown. Using data of a Gaussian random number with a sigma of 1 and a mean of 0 and a DAC 312 in the range of −3 to +3, it is shown that a minimum achievable modulation depth is not limited by the resolution of the DAC 312. In the current simulation, the data is modulated (at the multiplier 310) by the modulation factor $1+0.01 \sin(2\pi f_m t)$ before being transmitted to the DAC 312 where the modulation depth is 0.01 and the pilot tone frequency is $f_m$=25 MHz.

While it may be assumed that the minimum modulation depth would be determined by the formula $2/2^n$ for each (n)bit DAC, the system of the disclosure allows for more control of the modulation depth.

As shown in FIGS. 4a to 4c, on the Y-axis spectral power is shown in arbitrary units (a.u.) with frequency (in MHz) on the X-axis. FIG. 4a is directed at a simulation using a 6-bit DAC, FIG. 4b is directed at a simulation using a 5-bit DAC while FIG. 4c is a simulation using a 4-bit DAC. For each of the simulations, at 25 MHZ, the spectral power was around $1\times10^8$ arbitrary units, which represents 2% peak to peak amplitude of the signal being modulated. It is to be noted that the 4-bit DAC has a resolution limit of $1/2^4$=6.25%. Therefore, the graphs of FIGS. 4a to 4c indicate that a pilot tone of an amplitude less than a resolution limit of a DAC can be readily generated.

Turning to FIGS. 5a to 5d, graphs illustrating an intensity modulation of an optical signal are provided, assuming the original data without modulation has a Gaussian distribution of an optical power level. FIGS. 5a to 5d represent results of different modulation depths using a same 6-bit DAC having a resolution limit of $1/2^6$, which is approximately 1.6%. The optical signal power is generally proportional to the squared output voltage of the DAC 312. In equation form, the power may be seen as $|V_{m,DAC}(t)|^2-|V_{0,DAC}(t)|^2$. In the graphs, the Y-axis and X-axis represent the optical intensity difference with and without modulation and the sampling point index, respectively.

Figure 5B:
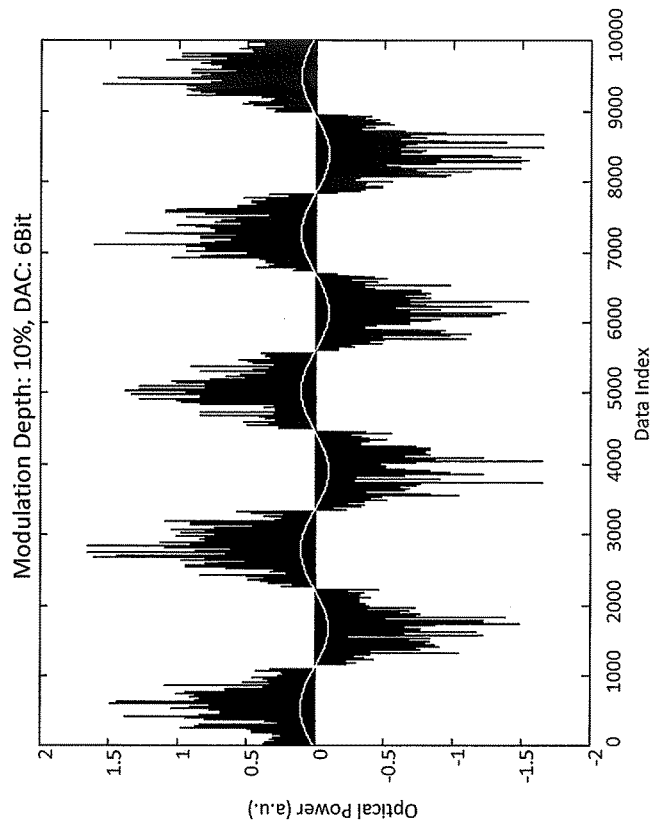
FIGS. 5a to 5d are representations of optical signal intensities for various modulation depths for a 6-bit DAC.
Figure 5A:
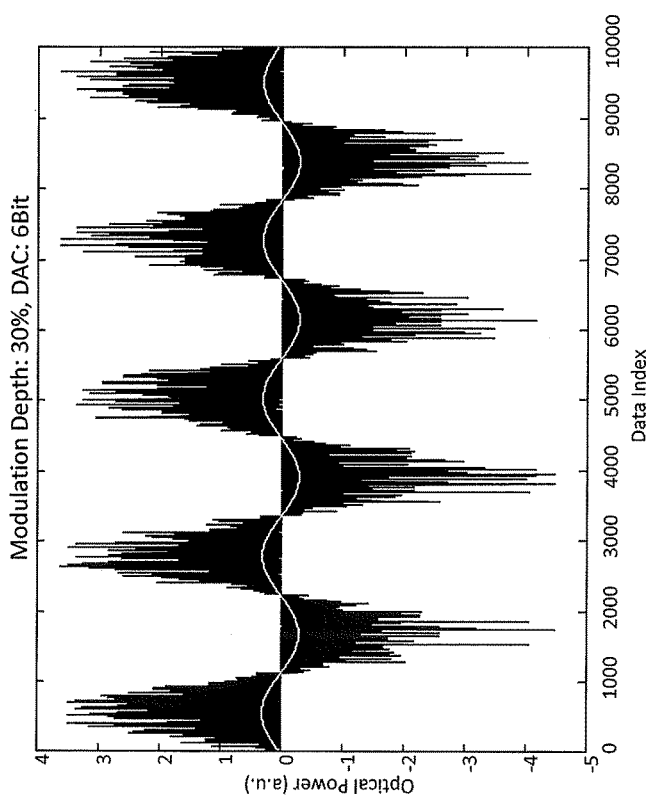
Figure 5D:
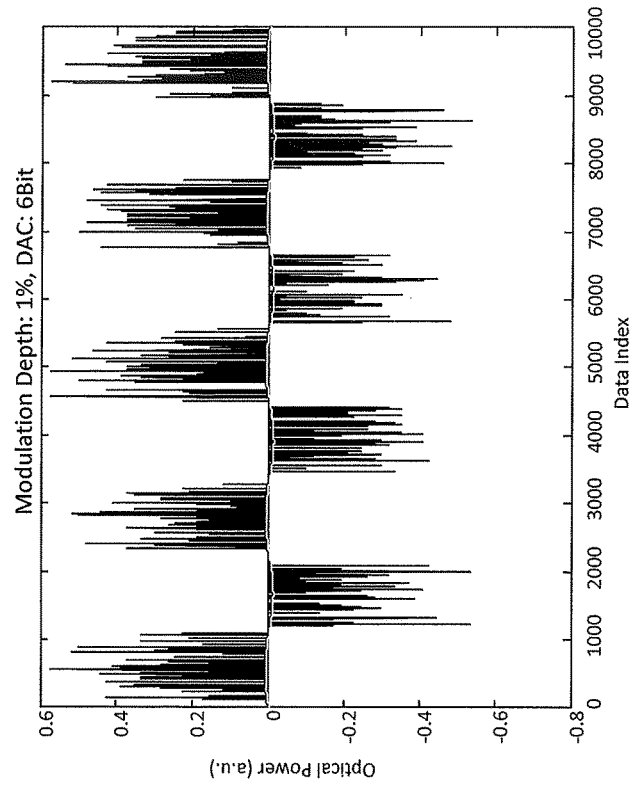
Figure 5C:
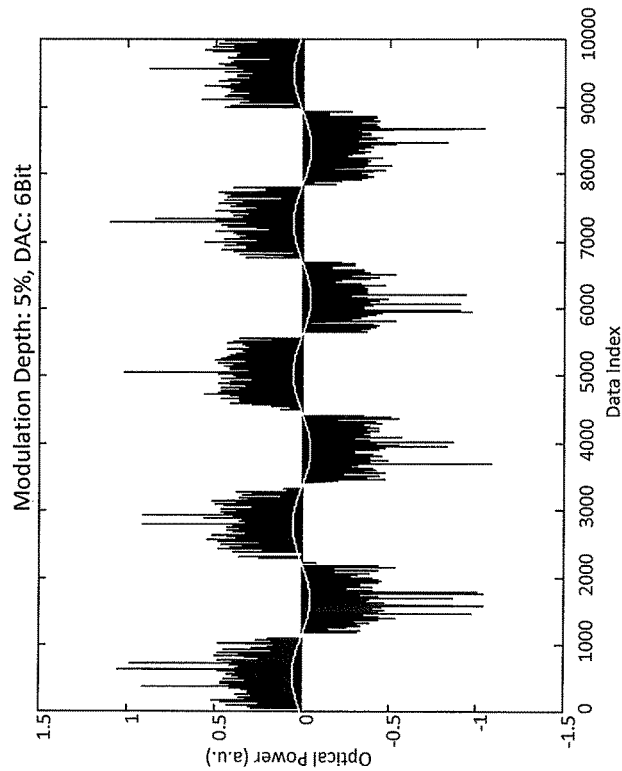

In FIG. 5a, a graph showing results for an optical signal having a modulation depth of 30%, while FIG. 5b reflects results for an optical signal having a modulation depth of 10%. The graph of FIG. 5c reflects results for an optical signal having a modulation depth of 5%, while FIG. 5d reflects the output of an optical signal having a modulation depth of 1%.

Figure 6B:
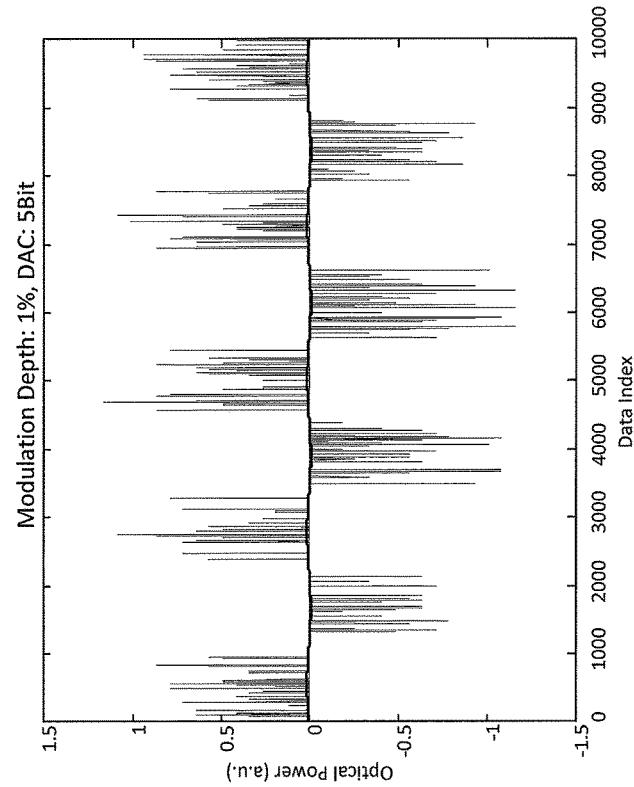
FIGS. 6a to 6d are representations of optical signal intensities for a constant modulation depths for different bit DACs.
Figure 6A:
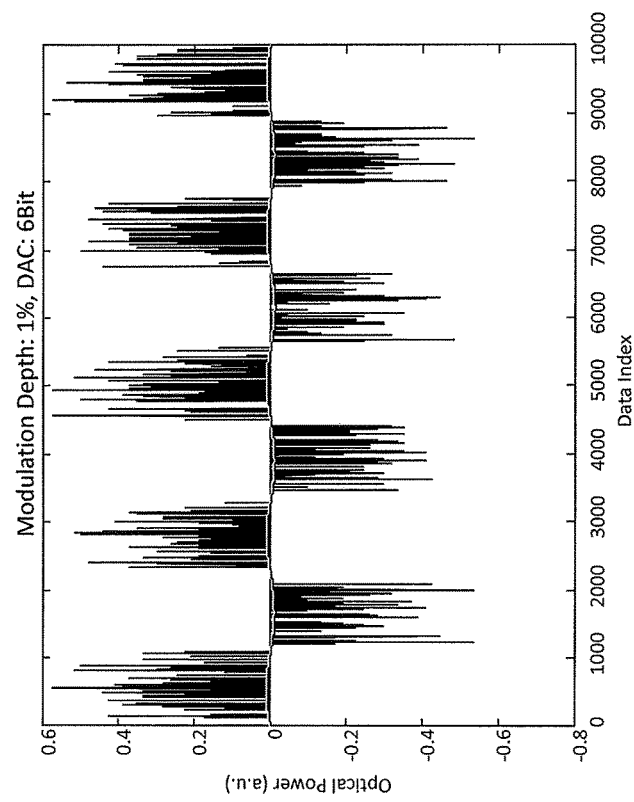
Figure 6D:
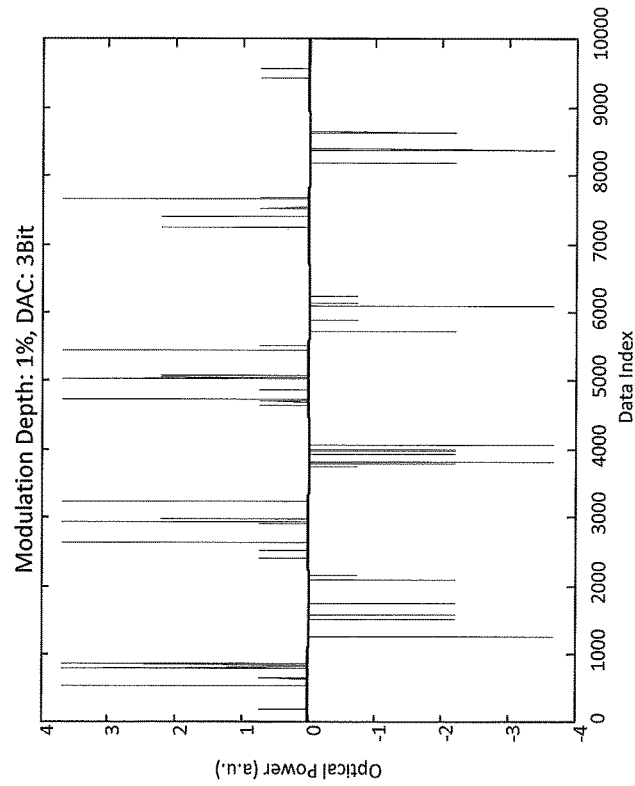
Figure 6C:
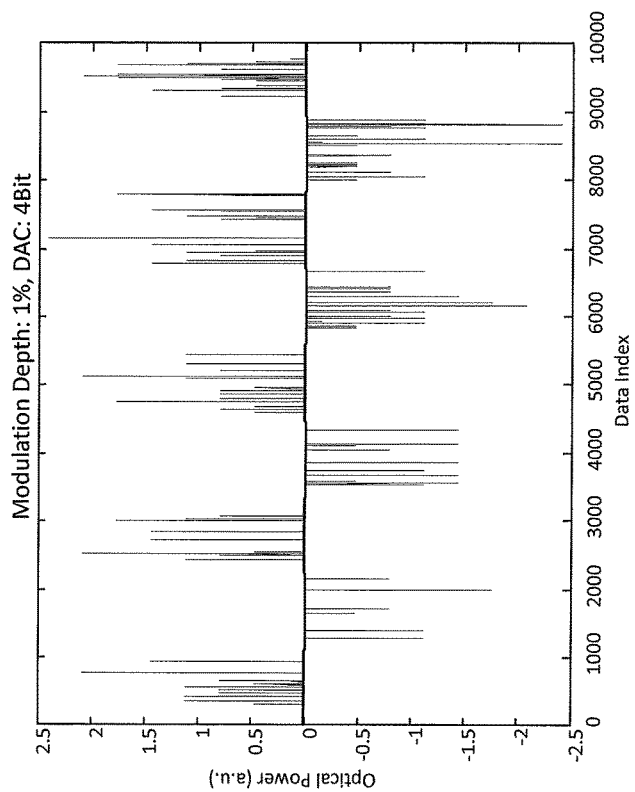

Turning to FIGS. 6a to 6d, various graphs showing optical signal power level having an identical modulation depth but for different DACs is shown. FIG. 6a shows the optical signal power for an optical signal having a modulation depth of 1% for a 6-bit DAC. This is identical to the FIG. 5d graph discussed above. FIG. 6b is a graph showing the optical signal power with a modulation depth of 1% for a 5-bit DAC. FIGS. 6c and 6d are graphs showing an optical signal power for a modulation depth of 1% for a 4-bit DAC and a 3-bit DAC, respectively. As can be seen, the modulation occurrence decreases as smaller bit DACs are used.

Figure 7B:
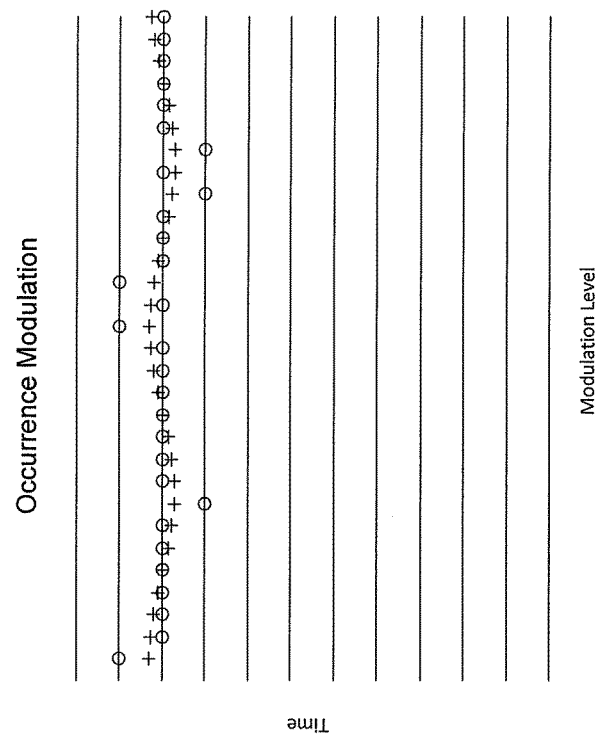
FIGS. 7a and 7b are graphical representations of occurrence modulation.
Figure 7A:
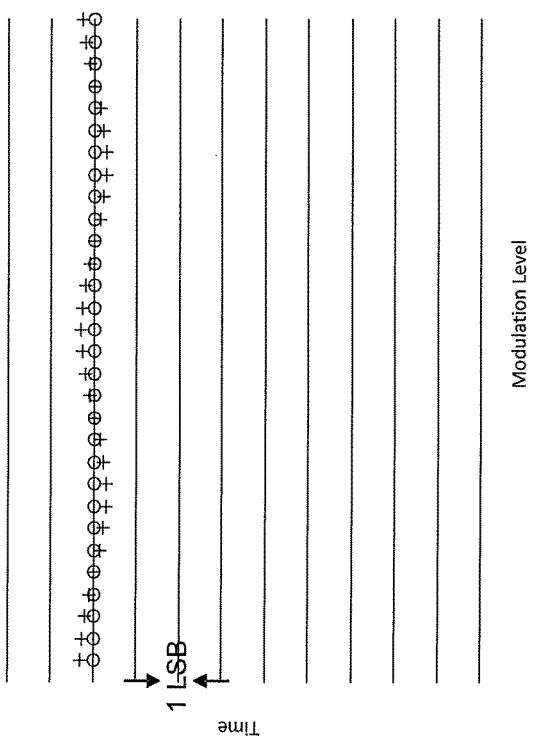

FIGS. 7a and 7b are graphs showing results when the applied modulation is smaller than the DAC LSB. In FIG. 7a, the original data is constant, and the applied modulation is smaller than 1 LSB. In this graph, nothing is changed to the DAC output as if no modulation is applied. In FIG. 7b, due to randomness in the data, the DAC output may be occasionally changed by 1 LSB, leading to occurrence modulation.

Figure 8B:
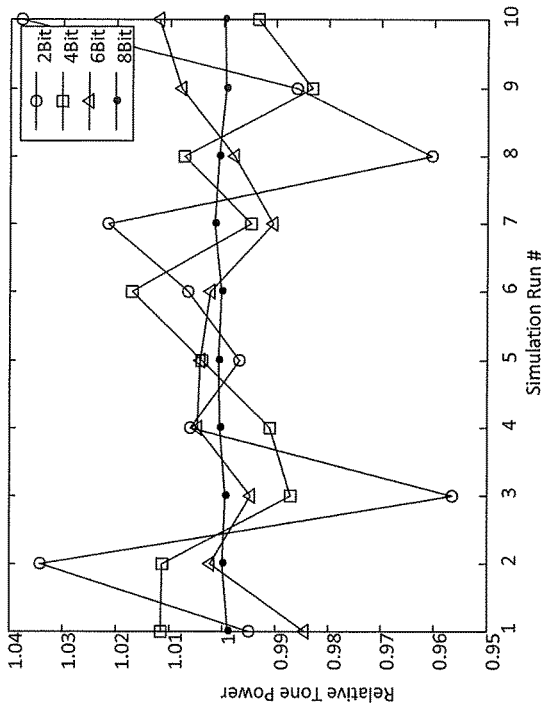
FIGS. 8a and 8b are representations of spectral analysis of an occurrence modulation signal.
Figure 8A:
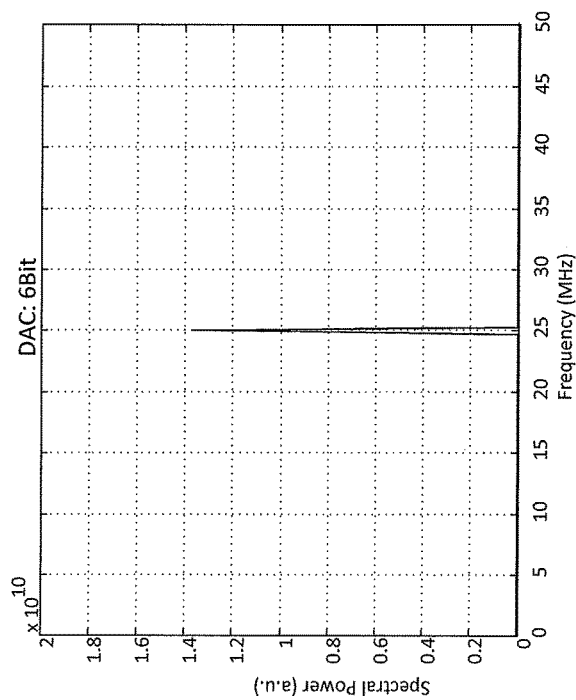

Turning to FIGS. 8a and 8b, graphs reflecting a pilot tone generated by occurrence modulation and pilot tone power fluctuation dependence on the number of DAC bits are provided. In these figures, the pilot tone has the same frequency as the amplitude modulated signal (FIG. 8a), however the fluctuation of the pilot tone power decreases as the quantization resolution increases (FIG. 8b). As is understood, the quantization resolution is based on the number of bits in the DAC being used.

The graph of FIG. 8a represents a 6-bit DAC (with spectral power on the Y-Axis and frequency (in MHz) on the X-Axis) when a 2%, 25 MHz pilot tone is applied. For the graph of FIG. 8b, the Y-Axis represents relative tone power and the X-axis represents the different simulations that were performed (numbered 1 to 10) for different bit DACs as identified in the legend. The line including a hollow circle represents the results for a 2-bit DAC, the line with the hollow square represents the results for a 4-bit DAC, the line with the hollow triangle represents a 6-bit DAC while the line with the filled circle represents an 8-bit DAC. As is seen, a lower DAC resolution leads to increased fluctuation in the pilot tone power since a lower DAC resolution has less occurrence modulation.

Figure 9:
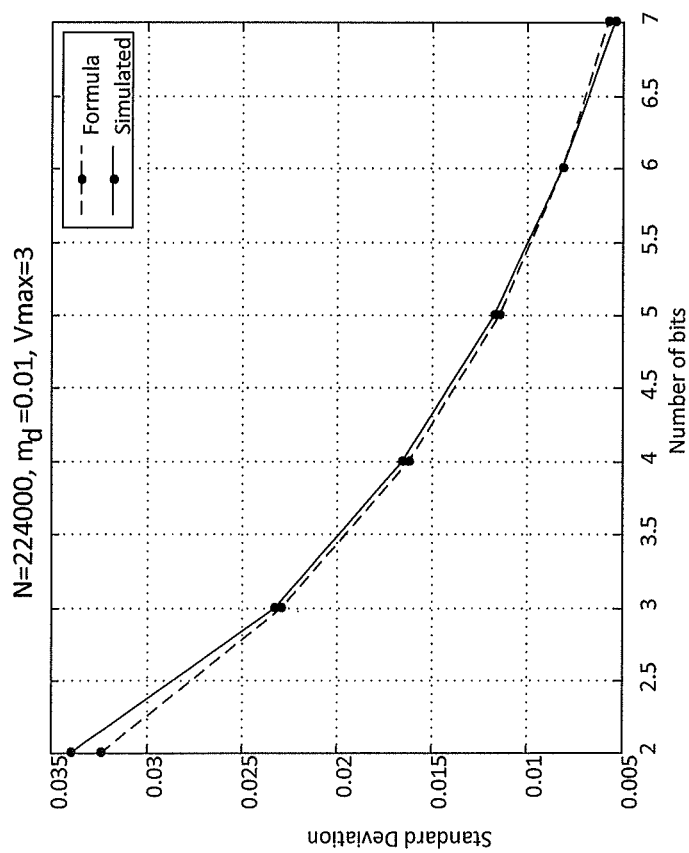
FIG. 9 is a graphical representation of performance analysis of an occurrence modulation signal.

Turning to FIG. 9, a graph reflecting a normalized standard variation of pilot tone power vs. number of bits is shown. On the Y-axis is the normalized standard deviation of the pilot tone power and on the X-axis is the number of bits. In the graph, N=224000 points are simulated, the modulation depth is 0.01 and the $V_{max}$ is 3. As understood in statistics, for a random number with mean X, its standard deviation is $1/\sqrt{X}$. In order to calculate the pilot tone variation, number of occurrence, $N_{eff}$, is to be calculated. If $V_{LSB}$ is the voltage of 1 LSB, $m_d$ is the modulation depth, then the probability of changing 1 LSB is $m_d/(\pi V_{LSB}/2)$. For N points, the number of points changed by the modulation is $N_{eff}=m_d/(\pi V_{LSB}/2)$. Therefore the standard deviation is given by $$\sigma = \frac{1}{\sqrt{N_{eff}}} = \frac{1}{\sqrt{N\frac{2}{\pi}\frac{m_d}{V_{LSB}}}} = \frac{1}{\sqrt{N\frac{2}{\pi}\frac{m_d}{V_{max}/2^{nbits-1}}}}$$

Figure 10B:
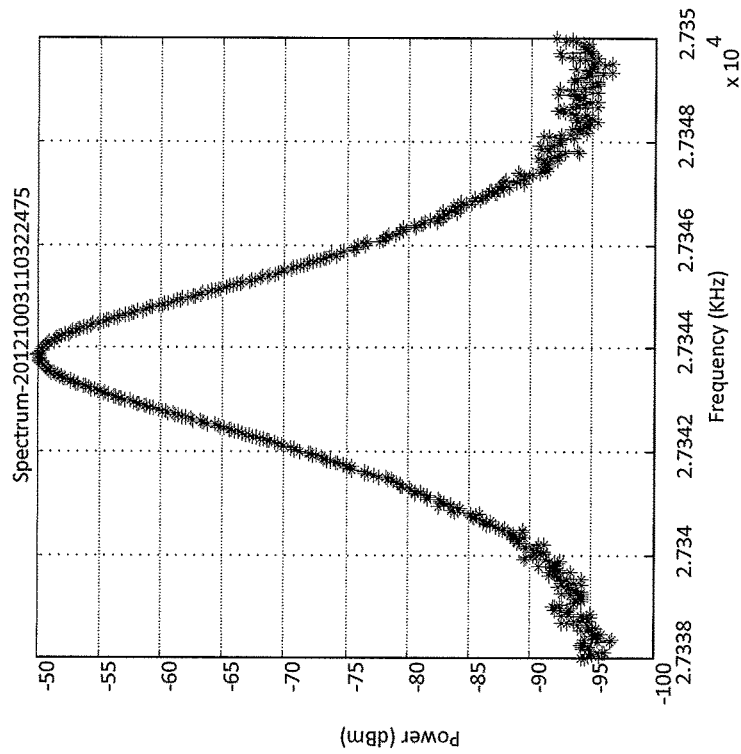
FIGS. 10a and 10b are graphical representations of experimentally obtained data.
Figure 10A:
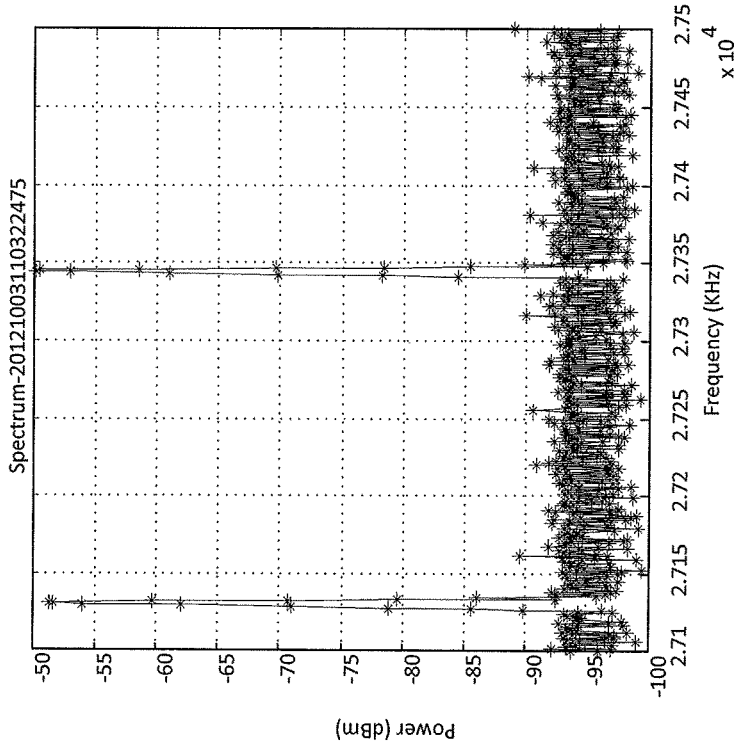

FIGS. 10a and 10b are graphs reflecting experimental verification showing power (in dB) as a function of frequency. In the graphs, the Y-axis represents power (in dBm) the X-axis represents Frequency (in kHz). The testing was performed with a PM-QPSK Transmitter with a 6-bit DAC having a buffer length of $2^{17}$. The DAC sampling rate is 56 GHz. The minimum frequency space was $28$ GHz/$2^{17}$ or 213.623 kHz. For demonstration purposes, the peak-to-peak modulation was approximately 2%. Different modulations frequencies were then applied to X and Y polarizations.

In the experiment, the applied pilot tone frequency for X polarization was 56 GHz/2064 or 27.13178 MHz and the applied pilot tone frequency for Y polarization was 56 GHz/2048 or 27.34375 MHz. The 3 dB spectral width is less than 2 kHz and is only limited by the measurement bandwidth. The graph shown in FIG. 10a reflects the power measured between the frequencies 27.1 and 27.5 MHz while the graph shown in FIG. 10b shows the power measured between 27.338 and 27.35 MHz frequencies.

One advantage of the current disclosure is that the implementation of the system for creating a pilot tone is simplified, since an external variable optical attenuator or an optical modulator, per each wavelength channel, is not required. This can represent significant cost savings for a wavelength division multiplexed (WDM) system utilizing 80-100 wavelength channels per optical fiber. By using digital apparatus already present within the node 102a-102g, such as the transmitter 112, a digital pilot tone can be added to data to be transmitted between nodes 102. By including occurrence modulation in the generation of the pilot tone, a modulation depth of less than 1 LSB may be realized. This digital pilot tone can then be converted to an analog equivalent along with the data to produce the optical signal to be transmitted. Another advantage of the current disclosure is that there is flexibility for the creation of the pilot tone. In other words, any single frequency (from kHz to GHz) can be generated. A spectrum spreading modulation may also be generated.

A further advantage that is realized by the system of the disclosure is that since the pilot tone is added in the digital domain, the modulation depth can be controlled to be more accurate and there is little or no need for calibration or feedback control. This results in improved power monitoring accuracy over some current solutions and an easier implementation. Furthermore, other forms of modulation can be realized such as phase or frequency.

While several embodiments have been provided in the present disclosure, it should be understood that the disclosed systems and methods might be embodied in many other specific forms within departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

What is claimed is:

1. A method of generating a pilot tone for an optical telecommunications system, the method comprising:
providing digital data having a data rate, for transmission to a destination node;
modulating the digital data at a pilot tone frequency lower than the data rate, to provide a modulated digital output; and
converting the modulated digital output to an analog signal to generate the pilot tone.

2. The method of claim 1, wherein modulating the digital data is performed to a peak-to-peak modulation depth less than a least significant bit (LSB) of the digital-to-analog conversion.

3. The method of claim 1 wherein modulating the digital data comprises
multiplying the digital data by a modulation factor, wherein the modulation factor equals $1+m_d \sin(2\pi f_m t+\varphi)$
where $m_d$ represents a modulation depth, $f_m$ represents a frequency value and $\varphi$ represents a phase value.

4. The method of claim 1 wherein modulating the digital data comprises:
modulating an amplitude, a phase, or a frequency of the digital data.

5. The method of claim 1 further comprising:
converting the analog signal to an optical signal for transmission to the destination node.

6. The method of claim 2, wherein the peak-to-peak modulation depth is less than 10% of the LSB of the digital-to-analog conversion.

7. The method of claim 2, further comprising, before modulating the digital data, pre-conditioning the digital data to add an amount of randomness to the digital data.

8. The method of claim 7 wherein pre-conditioning the digital data comprises adding a random or pseudo-random value of no greater than 0.5 of the LSB to each data point within the digital data.

9. A system for generating a pilot tone for an optical telecommunications link, the system comprising:
a data driver for providing digital data having a data rate;
a modulator for modulating the digital data provided by the data driver at a pilot tone frequency lower than the data rate, to provide a modulated digital output; and
a digital-to-analog converter (DAC) for receiving the modulated digital output and converting the modulated digital output to an analog signal to generate the pilot tone.

10. The system of claim 9, wherein the modulator is configured to modulate the digital data at a peak-to-peak modulation depth less than a least significant bit (LSB) of the DAC.

11. The system of claim 9 wherein the modulator comprises:
a multiplier for multiplying the digital data by a modulation factor.

12. The system of claim 9, wherein the DAC is a low-resolution DAC.

13. The system of claim 9, wherein the system is located within a digital signal processor (DSP).

14. The system of claim 9, wherein the system is located within a transmitter of the optical communications link.

15. The system of claim 9, wherein the modulator comprises an amplitude, a phase, or a frequency modulator.

16. The system of claim 9, further comprising an electro-optical converter for converting the analog signal to an optical signal for transmission in the optical telecommunications link.

17. The system of claim 10, wherein the peak-to-peak modulation depth is less than 10% of the LSB of the DAC.

18. The system of claim 10, further comprising a pre-conditioning apparatus configured for pre-conditioning the digital data to add an amount of randomness to the digital data.

19. The system of claim 11, wherein the modulation factor equals $1+m_d \sin(2\pi f_m t+\varphi)$
where $m_d$ represents a modulation depth, $f_m$ represents a frequency value and $\varphi$ represents a phase value.

20. The system of claim 18, wherein the pre-conditioning apparatus is configured to add a random or pseudo-random value of no greater than 0.5 of the LSB to each data point within the digital data.

* * * * *